(12) United States Patent  
Haltiner, Jr. et al.

(10) Patent No.: US 7,771,884 B2
(45) Date of Patent: Aug. 10, 2010

(54) SOLID OXIDE FUEL CELL STACK HAVING AN INTEGRAL GAS DISTRIBUTION MANIFOLD

(75) Inventors: Karl J. Haltiner, Jr., Fairport, NY (US); James S. Vordonis, Penfield, NY (US); John F. O'Brien, Lockport, NY (US)

(73) Assignee: Delphi Technololgies, Inc., Troy, MI (US)

( * ) Notice: Subject to any disclaimer, the term of this patent is extended or adjusted under 35 U.S.C. 154(b) by 1148 days.

(21) Appl. No.: 11/406,958

(22) Filed: Apr. 19, 2006

(65) Prior Publication Data

US 2007/0248868 A1 Oct. 25, 2007

(51) Int. Cl.
*H01M 2/14* (2006.01)
*H01M 2/08* (2006.01)
*H01M 8/12* (2006.01)
*H01M 8/04* (2006.01)

(52) U.S. Cl. .................. 429/458; 429/452; 429/456; 429/460; 429/436

(58) Field of Classification Search ............. 429/36–38, 429/26
See application file for complete search history.

(56) References Cited

U.S. PATENT DOCUMENTS

| | | | |
|---|---|---|---|
| 6,892,802 B2 * | 5/2005 | Kelly et al. | 165/148 |
| 6,967,064 B2 | 11/2005 | Haltiner, Jr. et al. | |
| 7,001,685 B2 * | 2/2006 | Bobrov et al. | 429/34 |
| 7,279,246 B2 * | 10/2007 | Kelly et al. | 429/39 |
| 2003/0235751 A1 | 12/2003 | Kelly et al. | |

\* cited by examiner

*Primary Examiner*—Patrick Ryan
*Assistant Examiner*—Karie O'Neill Apicella
(74) *Attorney, Agent, or Firm*—Thomas N. Twomey (57) ABSTRACT

An SOFC stack module including an integral individual stack manifold containing all of the gas pathways necessary for supply and exhaust of fuel gas and cathode air to and from the stack chimneys. The stack is mounted and hermetically joined directly to the manifold without an intermediate base plate. Flanges at the inlet and outlet ports couple to system distributary manifolds via high temperature sealing joints. The manifold preferably is fabricated of a ferritic stainless steel, and may be formed in a one-piece casting, a combination of multiple castings and stamped plates metallurgically joined (brazed or welded together), or stamped from sheet metal stock. Preferably, the manifold includes fin structures extending into adjacent fuel gas and cathode air chambers to enhance balancing of temperatures by heat exchange therebetween. Heat exchange may be further improved by configuring the manifold to have a plurality of interleaved anode and cathode gas supply chambers.

29 Claims, 8 Drawing Sheets

SOLID OXIDE FUEL CELL STACK HAVING AN INTEGRAL GAS DISTRIBUTION MANIFOLD

This invention was made with United States Government support under Government Contract/Purchase Order No. DE-FC26-02NT41246. The Government has certain rights in this invention.

TECHNICAL FIELD

The present invention relates to fuel cells; more particularly, to solid oxide fuel cell systems having manifold distribution of gases to and from one or more fuel cell stacks; and most particularly, to a fuel cell stack assembly having a gas distribution manifold formed integrally with the stack.

BACKGROUND OF THE INVENTION

A solid oxide fuel cell (SOFC) stack assembly is the power-producing component in an SOFC electric power plant such as an auxiliary power unit (APU) for a vehicle, a stationary power generating unit (SPU), a combined heat and power unit (CHP), or other such system. In a practical and manufacturable SOFC power system, the stack assembly typically is manufactured as a stand-alone component mounted into the power system for ease of assembly, service, and replacement. The power system provides fuel gas to the anode side of the stack, and provides air as an oxidant and coolant for excess heat removal to the cathode side of the stack. Partially depleted fuel gas is removed from the stack for use elsewhere in the power system. The SOFC stack must be maintained at an operating temperature between 650° C. and 1000° C., and preferably between 750° C. and 800° C.

The fuel gas and cathode air typically are fed to and removed from the stacked individual fuel cells by integral gas distribution channels within the stack known in the art as "chimneys". The chimneys are carefully designed to distribute the gases evenly to the anode and cathode gas cavities of each fuel cell unit in the stack. The gases entering and exiting the stack must also be routed in such as way that they are properly distributed to the chimneys to assure even flow distribution across the surfaces of each cell within the anode and cathode gas cavities.

A stack must be easily and reliably mounted to, and removable from, a system manifold with a good seal assuring minimal leakage of air and/or fuel gas. In addition, for proper sealing of the multiple layers in a stack, a compressive load must be maintained within the stack at all times.

In the prior art, these functions have been achieved by a specific arrangement wherein the stack is mounted to a base plate which in turn is mounted onto a system manifold. The base plate has openings in it that align with the chimneys as well as with openings in the system manifold. The distribution of gases to the chimneys is determined by the configuration and design of the system manifold. See, for example, U.S. Pat. No. 6,967,064 B2 and US Patent Application Publication No. US 2003/0235751 A1. The stack is sealed to the base plate by a high-temperature adhesive seal, and the base plate is sealed to the system manifold by a compressive high-temperature gasket.

In this prior art arrangement, the compressive loading mechanism must provide load not only for integrity of the stack layers but also through the stack to maintain a much higher compressive sealing load on the base plate gasket. There are multiple drawbacks to this design.

First, the base plate, fabricated from ferritic stainless steel to match the coefficient of thermal expansion (CTE) of the fuel cell stack components, must be very thick and massive to attempt to maintain a uniform compressive load on the gasket.

Second, the system manifold must have sufficient structural rigidity to attempt to maintain a uniform compressive load on the gasket against the base plate, requiring expensive alloys for providing such rigidity at the high SOFC operating temperatures.

Third, the stack compressive loading mechanism must provide more load than is required for stack seal integrity in order to provide sufficient load for the gasket, and is therefore heavier duty and dimensionally larger than would otherwise be necessary.

When a prior art SOFC power system is constructed to account for all these considerations, distribution of gases to the chimneys may still be suboptimal due to the system manifold requirements; further, leaking of the compressive gasket may still occur with unacceptable frequency, allowing combustible gas to mix with hot air, resulting in localized overheating or system failure.

Another requirement for the SOFC stack is that the fuel gas and cathode air be provided to the stack at similar temperatures (within approximately 25° C.). Depending on the power system configuration and operating condition or mode, the anode gas can vary over a wide range and not match the controlled temperature of the cathode air. As a result, a heat exchanger function has been added to the power system to equalize the anode and cathode gas stream temperatures (reference U.S. Pat. No. 6,967,064 B2). The problem with the prior concepts is that they were discrete devices which added to the packaging complexity and cost of the system.

What is needed in the art is a design and assembly arrangement for an SOFC stack and manifold that prevents leakage between the stack and the manifold and reduces the compressive loading requirement on the stack.

It is a principal object of the present invention to prevent leakage of fuel gas and/or cathode air from between an SOFC stack and a system manifold.

It is a further object of the invention to reduce the weight, size, cost, and complexity of an SOFC power unit.

It is a still further object of the invention to improve the durability and reliability of an SOFC power unit.

SUMMARY OF THE INVENTION

Briefly described, an SOFC stack in accordance with the invention includes an integral individual stack manifold containing all of the gas pathways necessary for proper supply and exhaust of fuel gas and cathode air to and from the stack chimneys. The stack lacks its own intermediate base plate, as in the prior art, and instead is mounted directly to the surface of the individual stack manifold to which it is hermetically joined by a high temperature bonding seal such as glass, ceramic adhesive, or braze, thus preventing leakage therebetween. The manifold includes one or more high strength alloy flanges at the inlet and outlet ports for coupling to system distributary manifolds via conventional, proven high temperature sealing joints using bolts or clamps. The gas streams entering and leaving the individual manifold are routed through a minimum of four such ports (anode in/out and cathode in/out). Preferably, an individual stack manifold is fabricated of a ferritic stainless steel for low cost and to match the CTE of the stack, and may be formed in a one-piece casting, a combination of multiple castings and stamped plates metallurgically joined (brazed or welded together), or stamped from sheet metal stock.

Preferably, an individual stack manifold includes fin structures extending into adjacent fuel gas and cathode air chambers to enhance thermal balancing of gas temperatures. Heat exchange may be improved still further by configuring the manifold to have a plurality of interleaved anode and cathode gas supply cavities.

BRIEF DESCRIPTION OF THE DRAWINGS

The present invention will now be described, by way of example, with reference to the accompanying drawings, in which.

The exemplification set out herein illustrates one preferred embodiment of the invention, in one form, and such exemplification is not to be construed as limiting the scope of the invention in any manner.

DESCRIPTION OF THE PREFERRED EMBODIMENTS

The benefits and advantages of an integral individual manifold for a fuel cell stack in accordance with the invention may be better appreciated by first considering a prior art assembly of a fuel cell stack and a separate gas distributing manifold, and the shortcomings thereof.

Figure 1:
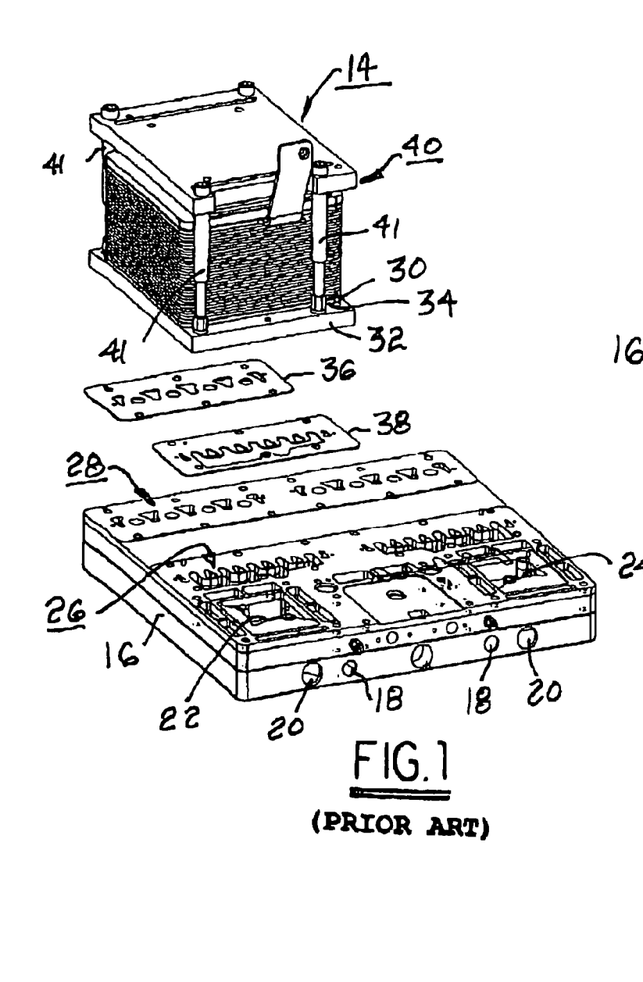
FIG. 1 is an exploded isometric view from above of a prior art fuel cell stack and separate supply manifold.
Figure 2:
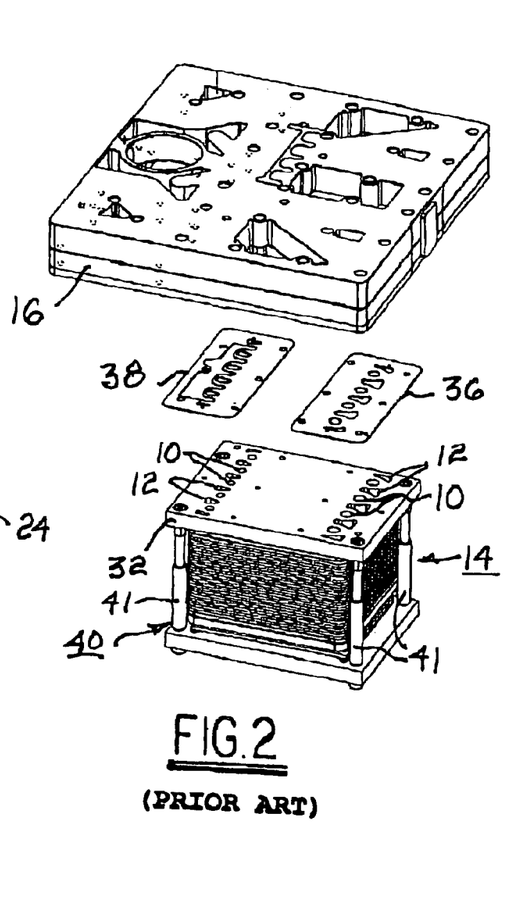
FIG. 2 is an exploded isometric view from below of the prior art fuel cell stack and separate supply manifold shown in FIG. 1.

Referring to FIGS. 1 and 2, in the prior art, distribution of anode fuel gas and air into and out of the anode and cathode distribution chimneys 10,12 of a fuel cell stack 14 (such as an SOFC stack) is carried out by a separate, complex gas distributing manifold 16, such as is disclosed in U.S. Pat. No. 6,967,064 B2. Manifold 16 routes these gases from respective anode and cathode inlet ports 18,20, through tubular heat exchangers (not shown but mounted to sockets 22,24) for partial equalization of temperature differences between the hot reformate fuel and the incoming air, and thence to outlet and return ports 26,28 on the surface of manifold 16. (Manifold 16 as shown is formed to accommodate two stacks 14 in gas flow parallel; in common practice, such stacks are then connected electrically in series.)

As described above, the bottom plates and current collector 30 of stack 14 are sealed to a base plate 32 by a high-temperature adhesive seal 34, and base plate 32 is sealed to manifold 16 by compressive high-temperature gaskets 36,38.

A compressive loading mechanism 40 including bolts 41 must provide load not only for integrity of the stack layers but also through the stack to maintain a much higher compressive sealing load on the base plate gaskets 36,38. There are multiple drawbacks to this design. First, base plate 32 must be very thick and massive to attempt to maintain a uniform compressive load on gasket 36,38. Second, manifold 16 must have sufficient structural rigidity to attempt to maintain a uniform compressive load on gaskets 36,38, requiring expensive alloys for providing such rigidity at the high SOFC operating temperatures. Third, the stack compressive loading mechanism 40 must provide more load than is required for stack seal integrity in order to provide sufficient load for gaskets 36,38, and is therefore heavier and dimensionally larger than would otherwise be necessary.

Referring to FIGS. 3 through 7, an improved gas distribution manifold 116 is shown for performing, for a single fuel cell stack, some of the functions of prior art manifold 16. Thus the upper surface 150 of cathode distribution element 152 defines an integral base plate upon which a stack (not shown in these FIGS.) may be constructed; prior art base plate 32 is eliminated. Ports 110,112 are matable with the corresponding chimneys in a stack to supply and recover anode gas and air to and from a stack. The present distribution element 152 is configured for co-flow of anode fuel gas and air through a stack; however, the manifold may be readily adapted for counterflow or crossflow as desired.

The mating of a stack to manifold 116 to form an integrated fuel cell stack module is described in detail further below.

Figure 3:
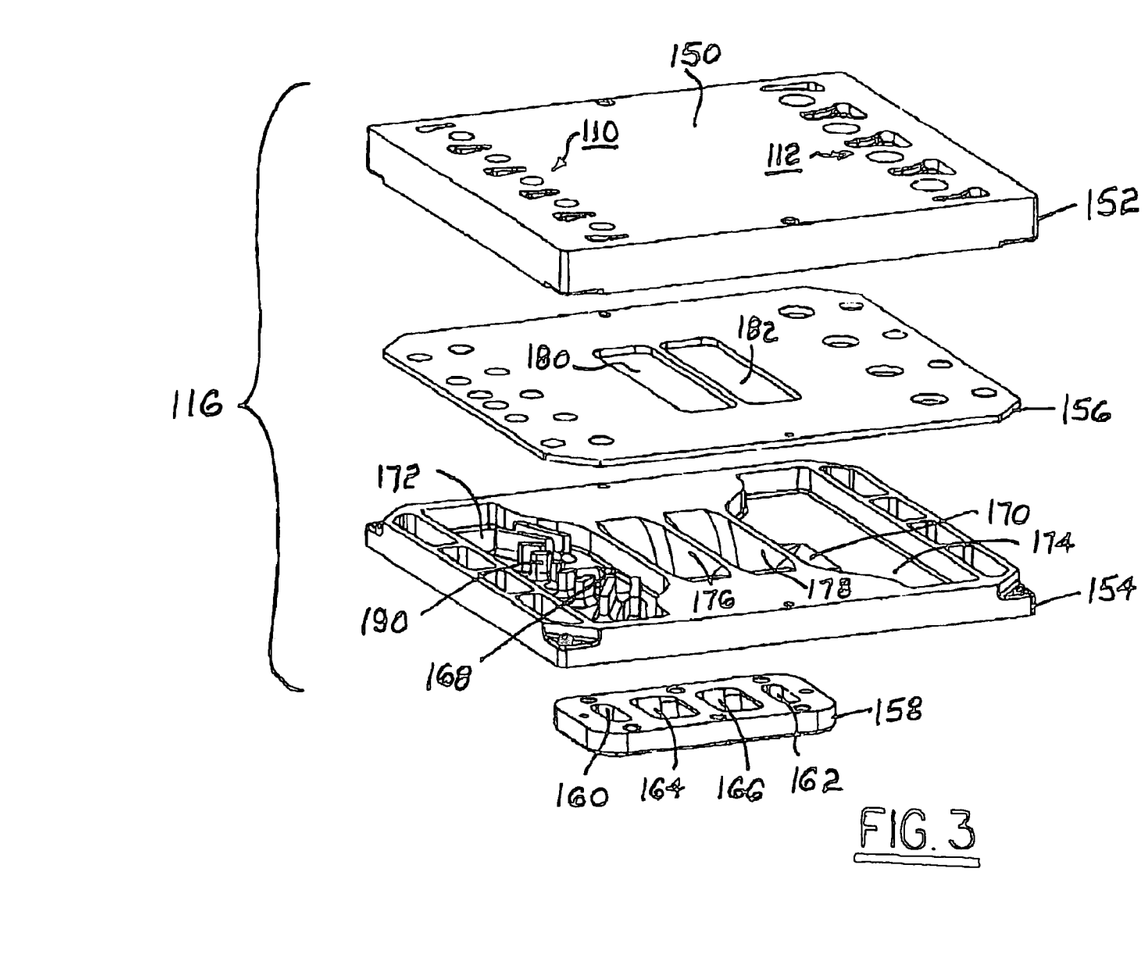
FIG. 3 is an exploded isometric view from above of an integral fuel cell manifold in accordance with the invention.
Figure 4:
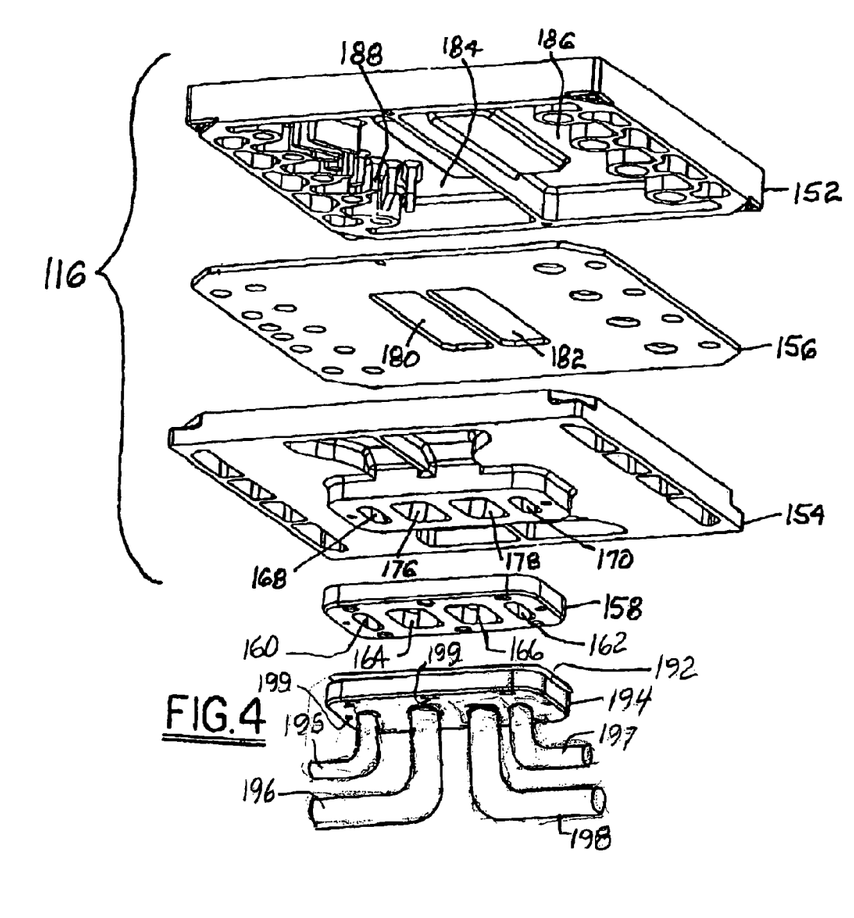
FIG. 4 is an exploded isometric view from below of the integral fuel cell manifold shown in FIG. 3.
Figure 5:
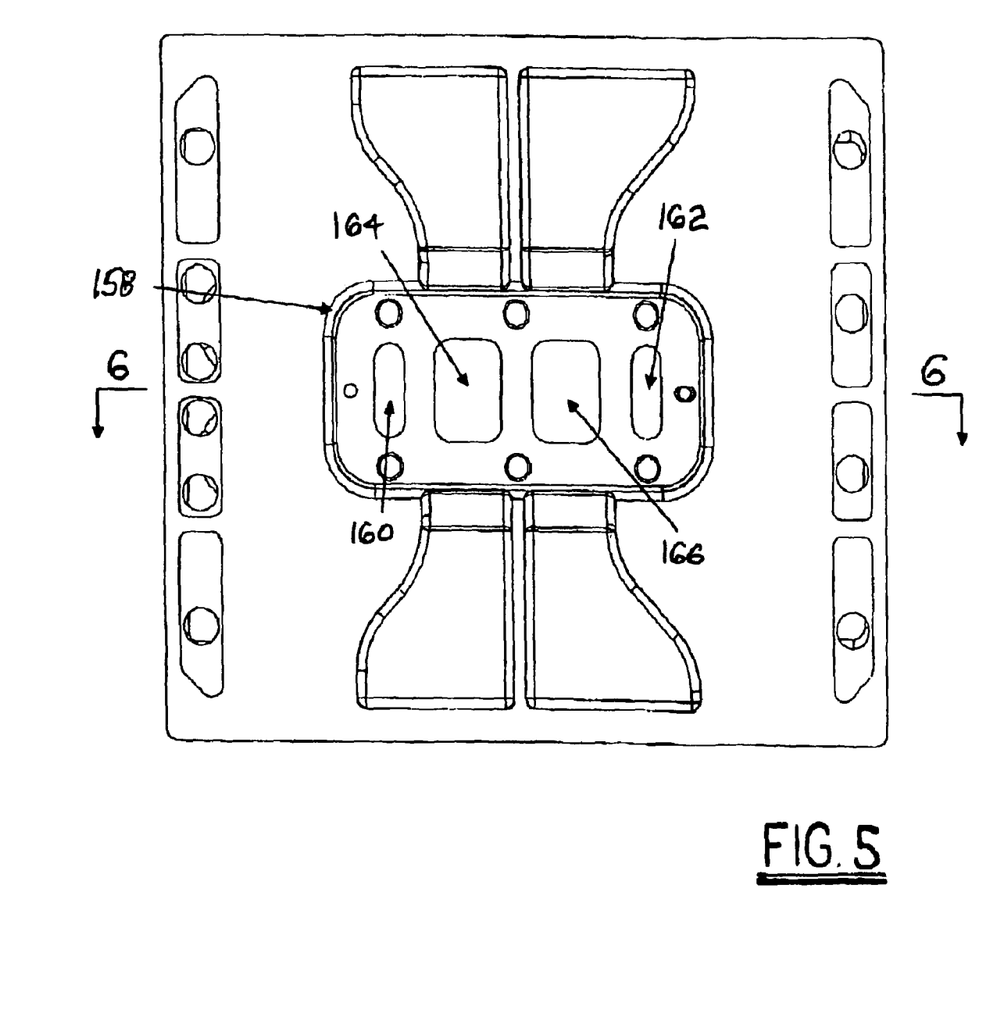
FIG. 5 is a bottom view of the manifold shown in FIGS. 3 and 4.

Improved manifold 116, in a presently preferred embodiment, comprises four separate elements that are permanently assembled together as by welding, brazing, or high-temperature adhesives. Cathode distribution element 152 is separated from an anode distribution element 154 by a separator plate 156. An attachment flange 158 is provided for attaching the assembled integral stack and manifold to a system manifold (not shown) for providing and receiving gases from the present assembly. Attachment flange 158 is provided with inlet and outlet ports 160,162 for anode fuel gas and inlet and outlet ports 164,166 for cathode air. Obviously, manifold 116 may be formed, within the scope of the invention, of more or fewer components than the exemplary four components shown, to provide the disclosed gas flow paths as may be advantageous for ease of manufacture. Attachment flange 158 provides for a simplified means for connecting a supply of fuel gas and air to the fuel cell stack and removing spend fuel gas and air from the stack as compared to prior art gas distribution manifold 16. Referring to FIG. 4, seal 192 and supply flange 194, including anode fuel gas and cathode air inlet tubes 195 and 196 and anode fuel gas and cathode air outlet tubes 197 and 198, can be readily attached to attachment flange 158 via bolts (not shown) through bolt holes 199 for a simplified routing of gases to and from the stack. While the remainder of the manifold is fabricated from ferritic stainless steel (or other suitable materials) to match the CTE (coefficient of thermal expansion) of the fuel cell stack components, the flange is fabricated from a high temperature alloy (such as Inconel) to provide clamping force to the seal from the bolt loads.

It will be seen that improved manifold 116 is substantially a cathode air management manifold stacked on top of an anode fuel gas management manifold with separator plate 156 therebetween. Anode fuel gas 157 passes through respective ports 168,170 in anode distribution element 154 to supply fuel gas 157 to anode inlet chamber 172 and to exhaust spent fuel gas 159 from anode outlet chamber 174. Separator plate 156 seals both chambers 172,174 and prevents anode fuel gas from reaching into the cathode air distributor. Conversely, cathode air passes through respective ports 176,178 in anode distribution element 154 and through respective ports 180, 182 in separator plate 156 to supply cathode air 161 to cathode air inlet chamber 184 and to exhaust spent cathode air 163 from cathode air outlet chamber 186.

Figure 6:
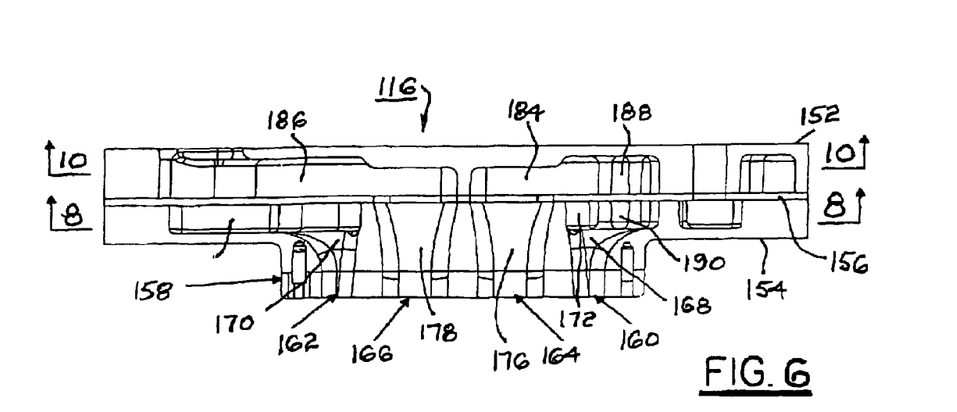
FIG. 6 is a view of a cross-section taken along line 6-6 in FIG. 5.
Figure 7:
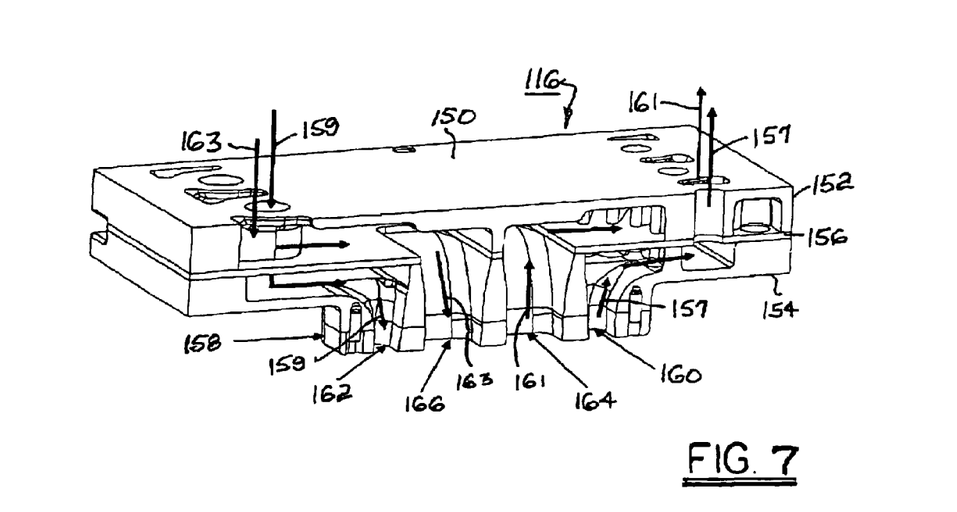
FIG. 7 is an isometric view of a cross-section taken along line 6-6 in FIG. 5.

An important preferred feature of an improved manifold in accordance with the invention is an integral internal heat exchanger. Because the present embodiment is arranged for co-flow of cathode air and anode fuel gas through a stack, the cathode air inlet chamber 184 overlies anode fuel gas inlet chamber 172, affording an opportunity for heat exchange therebetween to cool the anode fuel gas and warm the cathode air. Such heat exchange is conveniently provided by convective cathode air fins 188 disposed in cathode air supply chamber 184 and convective anode fuel gas fins 190 disposed in anode fuel gas supply chamber 172. For ease of manufacture, fins 188,190 may be cast integrally with respective parts 152,154 as shown in FIGS. 3 and 4. Alternatively and preferably, fins 188,190 may be cast integrally with separator plate 156, as shown in FIG. 6, and thereby extend into chambers 172,184 after assembly of the manifold. The latter configuration provides maximum heat transfer between the anode and cathode fins.

Figure 10:
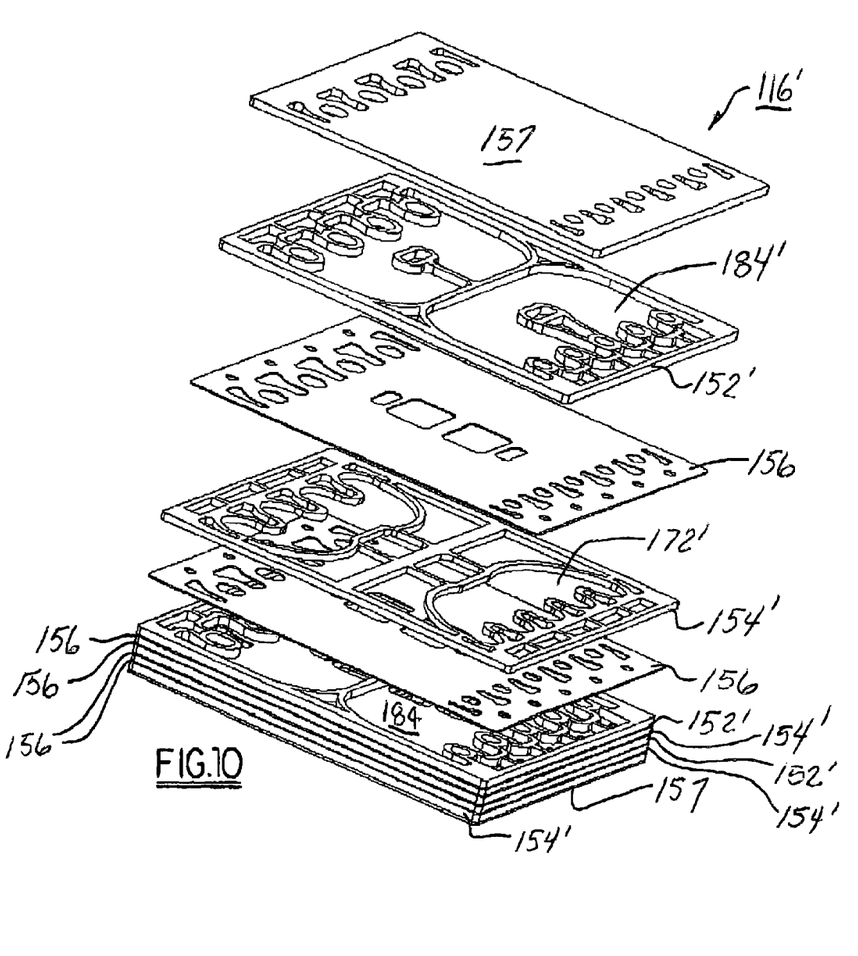
FIG. 10 is an exploded view of an improved manifold in accordance with the invention formed by interleaving a plurality of anode fuel distribution elements with a plurality of cathode air distribution elements.

Referring to FIG. 10, it will be further seen that even greater heat exchange can be achieved in an improved manifold 116' by forming the distribution elements 154, 156 as a plurality of thin individual distributors, preferably by interleaving a plurality of thin anode cutout plates 154' with a plurality of thin cathode cutout plates 152' separated by a plurality of separator plates 156 and bounded by end plates 157. The thickness of plates 152,154' are selected for optimal heat transfer to cool the incoming fuel gas passing through anode gas and to warm the incoming cathode air passing through cathode air inlet chamber 184'. While in one embodiment each of the interleaved cathode and anode cutout plates may be of the same thickness, it is not necessary that they are. What is important in accordance with the invention is that the thicknesses of the plates are selected to optimally control heat transfer between the plates to maintain the desired temperature relationship between the cathode air and anode gas streams. Thus, the thicknesses of the plates may be varied between the cathode and anode cutout plates, and among the plurality of cathode cutout plates and among the plurality of anode cutout plates, themselves.

Figure 8:
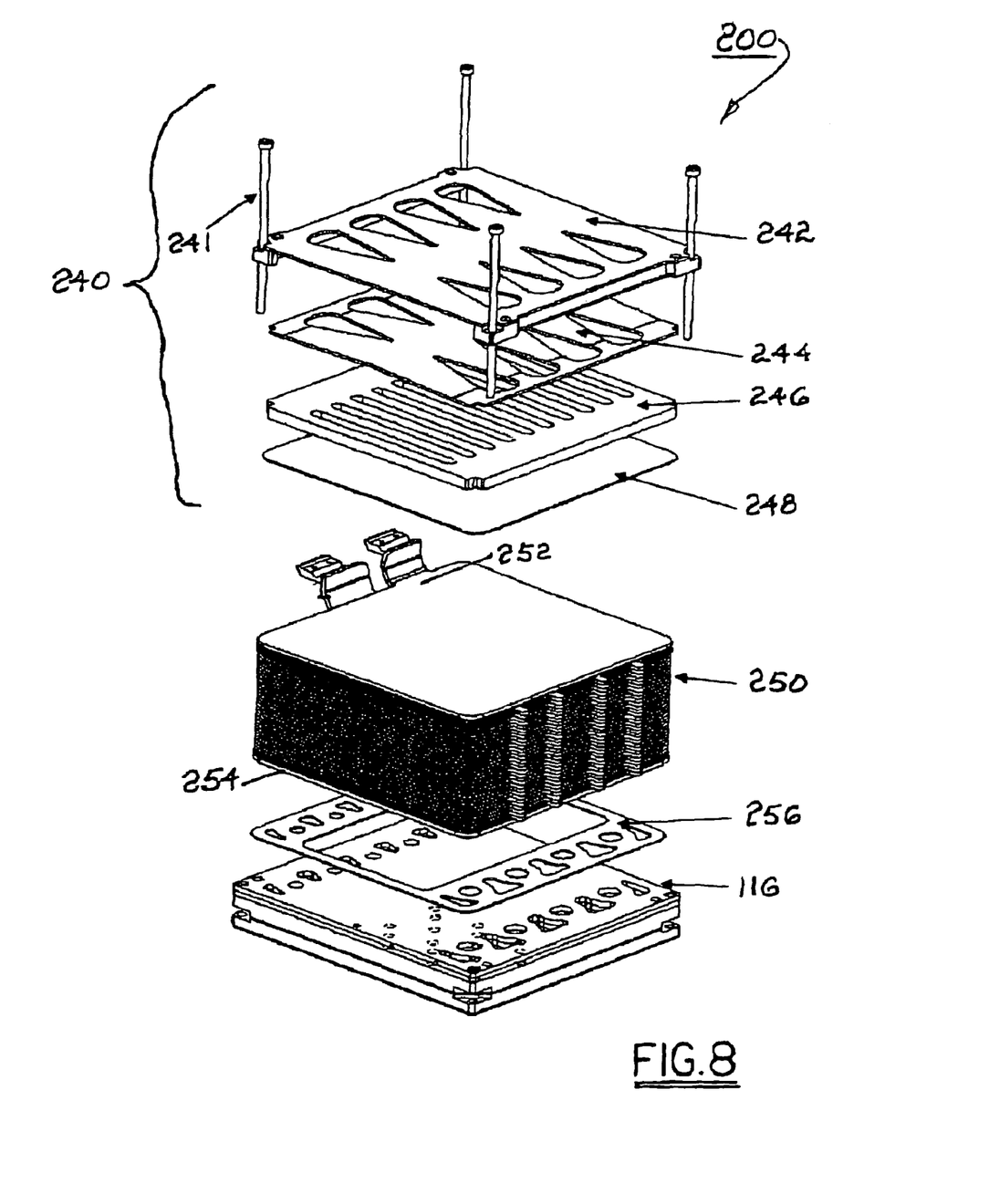
FIG. 8 is an exploded isometric view of a fuel cell stack assembly having an integral gas distribution manifold in accordance with the invention.
Figure 9:
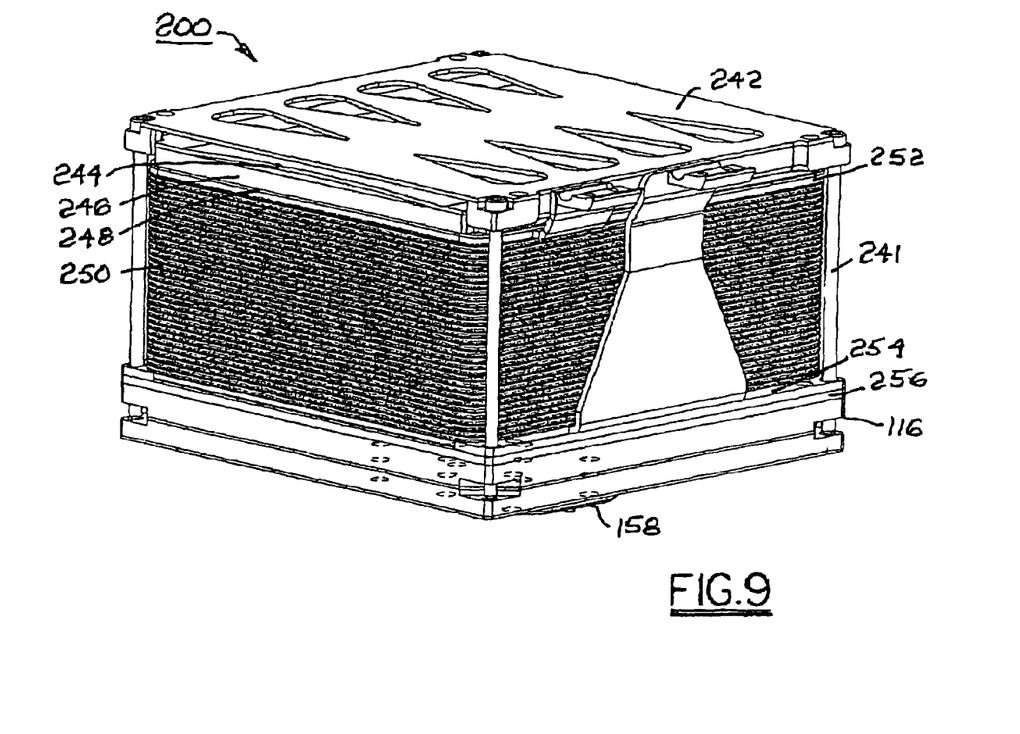
FIG. 9 is an assembled view of the fuel cell stack assembly and integral gas distribution manifold shown in FIG. 8.

Referring to FIGS. 8 and 9, an integral fuel cell stack module 200 in accordance with the invention comprises an improved compressive loading mechanism 240 including spring loading bolts 241, spring plates 242 & 244, a load pressure (distribution) plate 246, and an electrical insulator 248; a fuel cell stack 250 including positive and negative current collectors 252,254; an improved individual manifold 116 as described above; and a seal 256 for permanently bonding interconnect 254 to manifold 116. Optionally insulator 248 may be applied as a coating on the surface of pressure plate 246 instead of as a separate element.

While the invention has been described by reference to various specific embodiments, it should be understood that numerous changes may be made within the spirit and scope of the inventive concepts described. Accordingly, it is intended that the invention not be limited to the described embodiments, but will have full scope defined by the language of the following claims.

What is claimed is:

1. A fuel cell stack module comprising:
   a) a fuel cell stack including an anode fuel cell stack and a cathode fuel cell stack and a plurality of individual fuel cell units; and
   b) a manifold for supplying fuel gas fluid and cathode air fluid to said respective anode and cathode fuel cell stacks in the fuel cell stack and to exhaust fuel gas exhaust fluid and cathode air exhaust fluid from said respective anode and cathode fuel cell stacks in the fuel cell stack, said manifold being attached to and integral with said fuel cell stack, and the manifold including,
   a partitioned anode fluid distribution element having a first anode surface and a second anode surface opposite the first anode surface, and the anode fluid distribution element including an anode fuel gas inlet chamber being adapted for flow of the supplied fuel gas fluid therethrough, and said anode fluid distribution element configured to route the supplied fuel gas fluid to the said fuel cell stack and to route the fuel gas exhaust fluid from said fuel cell stack;
   a partitioned cathode fluid distribution element overlying the anode fluid distribution element and having a first cathode surface and a second cathode surface opposite the first cathode surface, and the cathode fluid distribution element including a cathode air inlet chamber being adapted for flow of the supplied cathode air fluid therethrough, and the first cathode surface being in connection to the fuel cell stack, said cathode fluid distribution element configured to provide flow management for the supplied cathode air fluid to the fuel cell stack and for exhausting the cathode air exhaust fluid from the fuel cell stack, and the cathode fluid distribution element including a plurality of openings for fluid communication at the first cathode surface of the fluids between the manifold and the fuel cell stack; and
   a separator plate overlying the anode fluid distribution element and disposed between the anode and the cathode fluid distribution element, said plate including a first plate surface and a second plate surface opposite the first plate surface, said first plate surface being in connection to the second cathode surface and the second separator surface being in connection to the first anode surface, wherein the plate is configured to enclose the chambers such that the supplied fuel gas fluid flows in the anode gas inlet chamber in the anode fluid distribution element and the supplied cathode air fluid flows in the cathode air inlet chamber in the cathode fluid distribution element.

2. The fuel cell stack module in accordance with claim 1 wherein said attachment of said fuel cell stack to said manifold includes a high temperature bonding seal selected from the group consisting of glass, ceramic adhesive, weld, and braze.

3. The fuel cell stack module in accordance with claim 1 wherein said manifold includes at least one component formed of a material selected to substantially match the CTE of the fuel cell stack.

4. The fuel cell stack module in accordance with claim 1 wherein said manifold includes at least one component formed of ferritic stainless steel.

5. The fuel cell stack module in accordance with claim 1 wherein said manifold is configured for one of co-flow, counter-flow and cross flow of said fuel gas fluid and said cathode air fluid.

6. The fuel cell stack module in accordance with claim 1 wherein said fuel cell stack includes a load mechanism in connection to the fuel cell stack and disposed in an opposed, remotely spaced relationship to the manifold, said load mechanism being configured to exert compressive force on said fuel cell stack.

7. The fuel cell stack module in accordance with claim 6 wherein said load mechanism includes,
   a) a pressure plate overlying the fuel cell units at an end of said fuel cell stack in an opposing, remote relationship from said manifold;
   b) at least one spring plate overlying said pressure plate; and
   c) a plurality of spring-loaded bolts extending through an outermost spring plate overlying said at least one spring plate, said spring-loaded bolts being anchored into said manifold such that the load mechanism is secured to the fuel cell stack module;
   wherein the spring-loaded bolts exert pressure applied in a direction away from the load mechanism toward the fuel cell stack.

8. The fuel cell stack module in accordance with claim 7 wherein said load mechanism further comprises an insulating element disposed adjacent said pressure plate and said fuel cell stack to electrically isolate the fuel cell units from the load mechanism.

9. The fuel cell stack module in accordance with claim 8 wherein said insulating element is applied as a coating to said pressure plate.

10. The fuel cell stack module in accordance with claim 8 wherein said insulating element includes a material selected from the group consisting of glass, ceramic, and mica.

11. The fuel cell stack module in accordance with claim 1 wherein the manifold further includes an internal heat exchanger comprising at least a portion of the cathode air inlet chamber in the cathode fluid distribution element overlying at least a portion of the anode fuel gas inlet chamber in the anode fluid distribution element, wherein heat transfers from the supplied fuel gas fluid flowing in the anode fuel gas inlet chamber adjacent the second plate surface to warm the supplied cathode air gas flowing adjacent the first plate surface in the cathode air inlet chamber.

12. The fuel cell stack module in accordance with claim 11 wherein said heat exchanger comprises at least one convective fin extending into at least one of said cathode air inlet chamber and said anode fuel gas inlet chamber.

13. The fuel cell stack module in accordance with claim 11 wherein said manifold comprises a plurality of anode fuel gas inlet chambers disposed in a plurality of anode fluid distribution elements being interleaved with a plurality of cathode air inlet chambers disposed in a plurality of cathode fuel distribution elements in a direction perpendicular to the respective surfaces of the respective elements, and each anode fluid distribution element being separated from each cathode fluid distribution element by a separator plate therebetween.

14. The fuel cell stack module in accordance with claim 1 wherein said manifold further includes,
   a) first entrance ports in said manifold for supplying said fuel gas fluid and said cathode air fluid from respective sources thereof;
   b) first exit ports for supplying said fuel gas fluid and said cathode air fluid from said manifold to said fuel cell stack;
   c) second entrance ports for exhausting spent fuel gas and cathode air from said fuel cell stack to said manifold;
   d) second exit ports for exhaust of spent fuel gas and cathode air from said manifold; and
   e) a plurality of passageways and chambers extending between said various entrance and exit ports for selectively providing passage of the fuel gas fluid and the cathode air fluid thereamong.

15. The fuel cell stack module in accordance with claim 14 wherein said first exit ports and said second entrance ports in said manifold are configured to mate to respective supply and exhaust chimneys in said fuel cell stack at the first cathode surface.

16. A fuel cell power plant including a fuel cell stack module, said fuel cell stack module comprising:
   a) a fuel cell stack including an anode fuel cell stack and a cathode fuel cell stack and a plurality of individual fuel cell units; and
   b) a manifold for supplying fuel gas fluid and cathode air fluid to said respective anode and cathode fuel cell stacks in the fuel cell stack and to exhaust fuel gas exhaust fluid and cathode air exhaust fluid from said respective anode and cathode fuel cell stacks in the fuel cell stack, said manifold being attached to and integral with said fuel cell stack, and the manifold including,
      a partitioned anode fluid distribution element having a first anode surface and a second anode surface opposite the first anode surface, and the anode fluid distribution element including an anode fuel gas inlet chamber being adapted for flow of the supplied fuel gas fluid therethrough, and said anode fluid distribution element configured to route the supplied fuel gas fluid to the said fuel cell stack and to route the fuel gas exhaust fluid from said fuel cell stack;
      a partitioned cathode fluid distribution element overlying the anode fluid distribution element and having a first cathode surface and a second cathode surface opposite the first cathode surface, and the cathode fluid distribution element including a cathode air inlet chamber being adapted for flow of the supplied cathode air fluid therethrough, and the first cathode surface being in connection to the fuel cell stack, said cathode fluid distribution element configured to provide flow management for the supplied cathode air fluid to the fuel cell stack and for exhausting the cathode air exhaust fluid from the fuel cell stack, and the cathode fluid distribution element including a plurality of openings for fluid communication at the first cathode surface of the fluids between the manifold and the fuel cell stack; and
      a separator plate overlying the anode fluid distribution element and disposed between the anode and the cathode fluid distribution element, said plate including a first plate surface and a second plate surface opposite the first plate surface, said first plate surface being in connection to the second cathode surface and the second separator surface being in connection to the first anode surface, wherein the plate is configured to enclose the chambers such that the supplied fuel gas fluid flows in the anode gas inlet chamber in the anode fluid distribution element and the supplied cathode air fluid flows in the cathode air inlet chamber in the cathode fluid distribution element.

17. The fuel cell stack module in accordance with claim 1 further including an attachment flange adapted for attachment to the second anode surface of the anode fluid distribution element and configured to transfer the fluids in and out of the manifold.

18. The fuel cell stack module in accordance with claim 12 wherein the at least one convective fin is integral to the separator plate.

19. The fuel cell stack module in accordance with claim 12 wherein the at least one convective fin is integral to at least one of the cathode fuel distribution element and the anode fuel distribution element.

20. The fuel cell stack module in accordance with claim 13 wherein each cathode fuel distribution element has a first thickness and each anode fuel distribution element has a second thickness, said first thickness and said second thickness being about equal.

21. The fuel cell stack module in accordance with claim 13 wherein each cathode fuel distribution element has a first thickness and each anode fuel distribution element has a second thickness, said first thickness being greater than said second thickness.

22. The fuel cell stack module in accordance with claim 13 wherein each cathode fuel distribution element has a first thickness and each anode fuel distribution element has a second thickness, said first thickness being less than the second thickness.

23. The fuel cell stack module in accordance with claim 13 wherein each cathode and anode fuel distribution element has a thickness, and the thickness comprises a varied thickness from element to element.

24. The fuel cell stack module in accordance with claim 11 wherein a majority portion of the cathode air inlet chamber overlies a majority portion of the anode fuel gas inlet chamber.

25. The fuel cell stack module in accordance with claim 11 wherein the cathode air inlet chamber overlies the anode fuel gas inlet chamber.

26. The fuel cell stack module in accordance with claim 13 wherein the interleaved plurality of anode and cathode flow distribution elements are bounded by a first end plate and a second end plate in an opposed, spaced relationship to the first end plate, said first end plate overlying a cathode fluid distribution element.

27. The fuel cell stack module in accordance with claim 17 wherein the attachment flange is formed of a high temperature alloy material.

28. The fuel cell stack module in accordance with claim 17 wherein the attachment flange further comprises supply inlet fluid ports and exhaust outlet fluid ports, and the supply inlet fluid ports have fluids flowing into the manifold from a supply external to the manifold and include at least a supplied fuel gas fluid and a supplied cathode air fluid, and the exhaust outlet fluid ports have fluids flowing from the manifold to an environment external to the manifold and include at least a fuel gas exhaust fluid and a cathode air exhaust fluid.

29. The fuel cell power plant in accordance with claim 16 wherein said fuel cell power plant is selected from the group consisting of an auxiliary power unit, a stationary power unit, and a combined heat and power unit.

* * * * *